Figures 1, 2, 3:
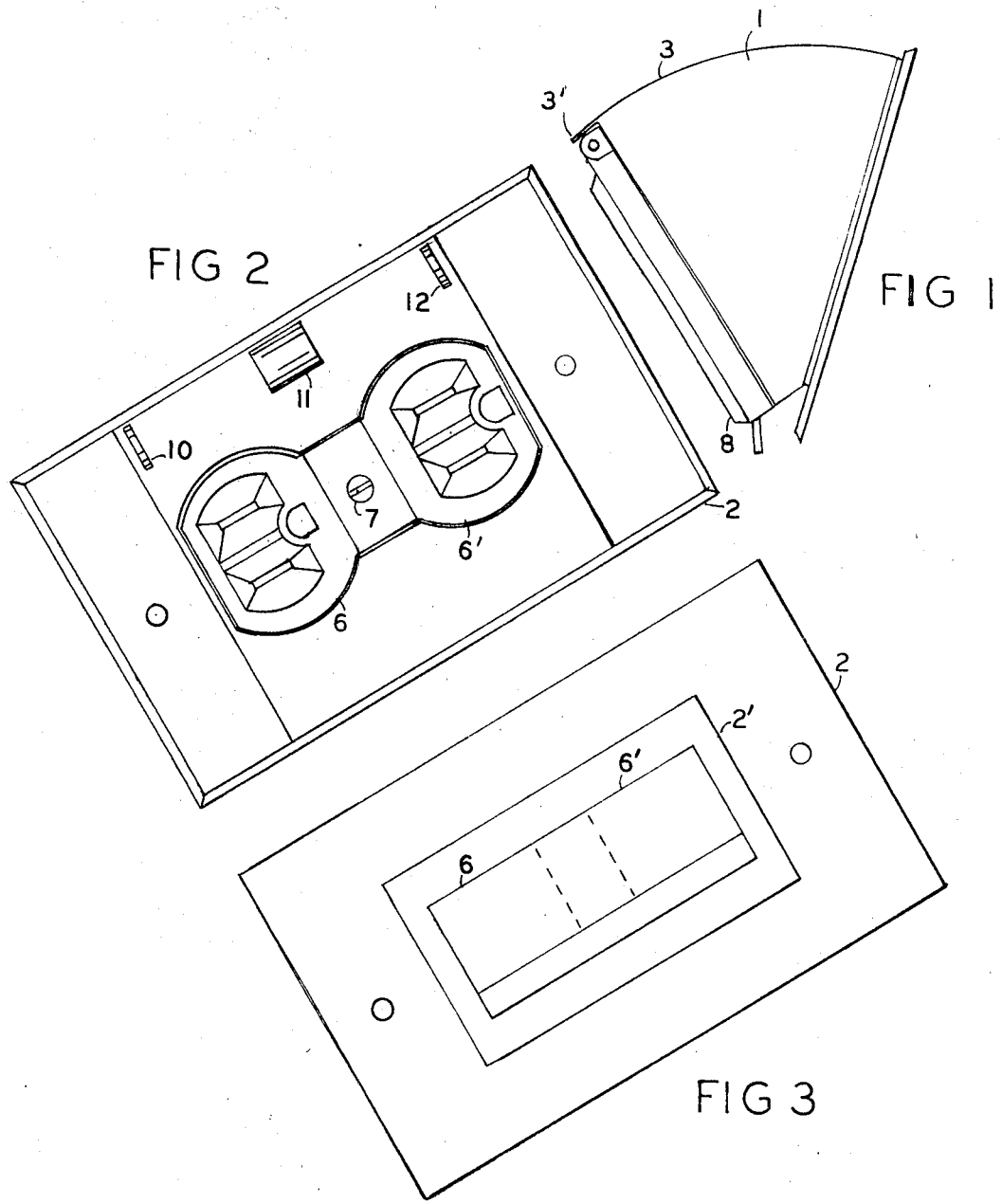

United States Patent

[11] 3,594,693

| [72] | Inventor | Alfred Robbins<br>80 E. Gates Avenue, Lindenhurst, N.Y. 11757 |
|---|---|---|
| [21] | Appl. No. | 887,276 |
| [22] | Filed | Dec. 22, 1969 |
| [45] | Patented | July 20, 1971 |

[54] WATERPROOF ELECTRICAL CONNECTION BOX COVER
4 Claims, 3 Drawing Figs.

| [52] | U.S. Cl. | 339/44 R, 174/81 R |
|---|---|---|
| [51] | Int. Cl. | H01r 13/44 |
| [50] | Field of Search | 174/65, 66, 81; 339/36, 43, 44 |

[56] References Cited

UNITED STATES PATENTS

| 2,441,643 | 5/1948 | Mickler | 339/44 R X |
|---|---|---|---|
| 3,439,108 | 4/1969 | Zerwes | 174/81 X |

FOREIGN PATENTS

| 49,605 | 11/1940 | Netherlands | 339/44 R |
|---|---|---|---|
| 264,638 | 9/1968 | Austria | 339/44 R |

Primary Examiner—Ernest R. Purger
Assistant Examiner—Terrell P. Lewis
Attorney—James P. Malone ABSTRACT: An outdoor electrical connection box cover which is protected against rain and snow. The cover is mounted on a conventional junction box mounted in a wall. The face of the cover containing the electrical sockets is angled down at a substantial angle and the cover has a hood or shield to protect the face from rain and snow. Snap-type covers are mounted over the electrical sockets.

PATENTED JUL20 1971 3,594,693

INVENTOR.
ALFRED ROBBINS

WATERPROOF ELECTRICAL CONNECTION BOX COVER

This invention relates to outdoor electrical connection box covers having electrical plug sockets.

More particularly, the invention comprises a unitary hooded box cover, for a conventional junction box mounted in a wall wherein the face which contains the open electrical sockets is angled down. The cover has a hood or shield extending over the face to protect the electrical connections from driving rain or snow.

Conventional electrical outlet box covers are generally mounted flush against a wall so that the electrical socket faces are vertical. These devices generally have snap-type covers over the sockets. However, if the covers are not closed, or is there is a leak in them, or if an electrical plug is in the socket, then there is a possibility that a driving rain or snow will wet the electrical members causing corrosion and short circuits.

The present invention solves these problems by providing a unitary hooded box cover made from a single diecasting. The face of the cover is angled down and the cover contains an extending lip or shield extending it over the face to protect the electrical sockets against the driving rain, snow, dirt and dust.

Accordingly, a principal object of the invention is to provide a new and improved outdoor electrical connection box cover.

Another object of the invention is to provide a new and improved outdoor electrical connection box cover which is waterproof.

Another object of the invention is to provide a new and improved outdoor electrical connection box cover which is waterproof wherein the face of the cover containing the electrical sockets is angled down and the cover has a hood extending over the upper portion of the face to protect the electrical sockets and electrical plug connections against driving rain, snow, dirt and dust.

These and other objects of the invention will be apparent from the following specifications and drawings of which:

FIG. 1 is a side view of an embodiment of the invention.
FIG. 2 is a detail view of the face of the cover.
FIG. 3 is a rear view of the cover.

Referring to the figures, the invention generally comprises a single die-cast cover 1 having a flat base portion 2 which has mounting holes. The upper portion of the cover forms a hood 3 having an extending lip 3'.

The face 4 of the hollow cover is angled downwardly at an angle of, for instance 45°, when the cover is mounted on a vertical wall W. On the rear of the face portion is mounted one or more conventional electrical sockets 6, 6' by means of the screw 7.

Conventional snap-type covers 8 are pivotally mounted by means of mounting members 10, 11, 12. The covers 8 are not shown in FIG. 2 in order to show the front of the electrical sockets 6 and 6'.

The cover device is installed by inserting screws or other fasteners in the wall box. The cover is fastened to a conventional box set in a hole in the wall. The cover is preferably mounted with a gasket around its edges.

The face 4 of the cover is angled down about 45° when the base of the box is mounted in a vertical plane as illustrated in FIG. 1. Note that the lip 3' of the hood extends over the hinge mounts 10, 11 and 12 and prevents rain from dripping into the hinges or on top of the face containing the electrical sockets. The angle of the cover is chosen to provide protection against a driving rain and still permits easy insertion of plugs into the sockets.

FIG. 3 shows a rear view of the cover. The base portion 2 has a large opening 2' sufficient to permit insertion of the electrical socket 6. The edges of the base portion 2 are preferably mounted on a gasket which extends around the edges to prohibit moisture from entering the cover.

I claim:

1. An outdoor cover for a wall-mounted electrical connection box comprising,
    a flat mounting base portion,
    a central opening in said base portion to receive electrical connections from said box,
    a hollow hood portion connected to said base portion disposed over said central opening,
    openings in said base portion disposed receive means to connect said base portion to said box,
    the face of said box extending from the plane of said mounting base portion at a substantial angle,
    said hood portion having an upper lip shield extending out over said face portion,
    whereby said face portion faces downwardly at a substantial angle and said base portion is vertical and said lip shield portion protects said face portion from rain and snow.

2. Apparatus as in claim 1 wherein said face portion has at least one hinged spring-loaded cover adapted to cover electrical sockets mounted in said hollow box.

3. Apparatus as in claim 1 wherein said face portion extends from said flat mounting base portion at an angle of substantially 45°.

4. Apparatus as in claim 1 wherein said electrical connection box comprises a flat mounting portion and a top hood portion formed of a single diecasting.